United States Patent [19]

Stuart

[11] Patent Number: 4,646,859

[45] Date of Patent: Mar. 3, 1987

[54] SCALE

[75] Inventor: James M. Stuart, Malvern, Pa.

[73] Assignee: Malvern Scale Company, Malvern, Pa.

[21] Appl. No.: 735,503

[22] Filed: May 17, 1985

[51] Int. Cl.$^4$ .................. G01G 21/10; G01G 3/14; G01G 21/24

[52] U.S. Cl. .................. 177/187; 177/210 C; 177/255

[58] Field of Search .................. 177/184, 187–189, 177/255, 256, 210 C

[56] References Cited

U.S. PATENT DOCUMENTS

| | | | |
|---|---|---|---|
| 3,780,818 | 12/1973 | Lumby et al. | 177/256 |
| 4,519,464 | 5/1985 | Stuart | 177/210 C X |
| 4,524,840 | 6/1985 | Stuart | 177/210 C |
| 4,544,043 | 10/1985 | Stuart | 177/210 C X |
| 4,558,600 | 12/1985 | Lee | 177/210 C X |
| 4,561,511 | 12/1985 | Stuart | 177/210 C X |

Primary Examiner—George H. Miller, Jr.
Attorney, Agent, or Firm—Caesar, Rivise, Bernstein, Cohen & Pokotilow, Ltd.

[57] ABSTRACT

A scale comprising a stationary frame assembly, platform means arranged to move vertically upon receipt of some material thereon and at least one movable beam assembly, each movable beam assembly being coupled to the stationary frame assembly by a force sensing means which resists downward movement of the platform. The platform is coupled to the beam assemblies that are movable, and each movable beam assembly has a section for supporting a displacement sensing means thereon. Most preferably the displacement sensing means is an electronic sensing means adapted to move substantially horizontally for detecting movement of the movable beam assemblies that is transmitted through the platform means when the material is placed on said platform means, and said electronic sensing means produces a signal indicative of the weight of said material.

15 Claims, 4 Drawing Figures

SCALE

BACKGROUND OF THE INVENTION

This invention relates generally to a measuring apparatus, and more particularly to a weighing scale.

Various scales are commercially available for providing a digital or other indication of the weight of a body placed on a weighing pan of the scale. Many of the recently developed scales make use of electronic circuitry including integrated circuits and microcomputer controls for perfecting various scale operations such as weighing, counting, altering resolution, converting units, etc. In this regard, these devices comprise electronic circuitry usually including a movable transducer and mechanical interfacing means between the electronic circuitry and the weighing pan. To that end, notwithstanding the high levels of sensitivity and accuracy associated with the electronic circuitry, the overall accuracy of the scale for small weights nonetheless depends largely upon the ability of the mechanical means to avoid introducing vibrational and other errors into the weighing process.

With regard to the prior art, scales have tended to be one of several types. One type of scale, often referred to as a balance, is constructed so that the object being weighed on the scale's weighing pan applies a downward force to the free end of a lever arm. The lever arm is arranged to pivot about a fulcrum, so that the weight of the object on the weighing pan can readily be determined in terms of how much weight or force must be applied to the opposing end of the lever arm to exactly balance or offset the load on the weighing pan. Although these types of scales tend to be fairly accurate and are generally suitable for their intended purposes, they also tend to be somewhat slow in operation (e.g., by requiring the person operating the scale to move calibrated weights along the lever arm to achieve an exact balance) and are not easily adapted for use in combination with electronic measuring or indicator means.

Other prior art scales, of either mechanical or electronic construction, have typically included spring means and a movable arm arranged to pivot about a fulcrum, wherein the object being weighed applies a generally downward force against the free end of the arm, with the spring means serving to upwardly bias or resist any downward movement of the free end. Mechanical or electrical sensing means responsive to the lever arm's displacement are typically used to measure and indicate the weight of the object on the weighing pan. Although these scales are also generally suitable for their intended purposes, one major drawback associated with such scales is that their weighing accuracy, especially for small weights, often is adversely affected by vibration in the scale's environment, i.e., vibration transmitted to the scale through the supporting structure upon which the scale is resting.

Approaches to eliminating the adverse effect of vibration in the up/down direction are disclosed in applicant's U.S. patent application Ser. No. 584,416, entitled "Electronic Scale With Counterbalance". In the first embodiment disclosed in applicant's '416 application a generally horizontal, movable lever arm carrying a movable, generally horizontally disposed capacitor plate at the end thereof is counterbalanced so that the center of gravity of the lever arm and the elements supported thereon is along the pivot axis of the fulcrum of said lever arm.

The counterbalanced arrangement employed in the first embodiment disclosed in the '416 application generally is effective in minimizing weighing inaccuracies created by vibrations imparted to the movable parts of the scale in an up/down direction. However, that counterbalanced arrangement is not designed to eliminate or minimize weighing inaccuracies resulting from lateral or rotary vibrations imparted to the scale from the surrounding environment.

Vibrations that impart a rotational force to the lever arm of the first embodiment of the scale disclosed in the '416 application initially will cause the lever arm to be rotationally displaced about its fulcrum, followed by gradually attenuating rotational oscillations of said arm. Although these oscillations may be small in amplitude, the amount of error introduced into the weighing process as a result thereof often is sufficiently great to produce substantial weighing inaccuracies, particularly where lightweight objects are being weighed.

Moreover, although the adverse effects of up/down vibrations are minimized in the first embodiment of the scale disclosed in the '416 application, movable elements of the scale, including the movable horizontally disposed capacitor plate, still will move vertically to some extent under the influence of such vibrations. Such vertical movement of the capacitor plate, however small, introduces undesired errors into the weighing operation, which can be particularly significant when the precision measurement of a lightweight object is required.

A further deficiency of the first embodiment of the scale disclosed in the '416 application is that any change in the length of the lever arm or in the direction of the force applied to the pull cable will result in a corresponding change in the applied moment, any hence the perceived weight, thereby resulting in errors in the weighing operation. The length of the lever arm is equal to the distance between the axis of rotation and the center of action of the applied force (applied by the pull cable) which is applied perpendicularly to the lever arm. Ideally the pull cable will be oriented perpendicularly to the lever arm, and the center of action of the applied force will be the center line of the cable. However, in practice, the center of action of the pull force may move from the center line, either closer or further from the axis of rotation, in an unpredictable manner with time and usage of the scale. This may occur as tension shifts from one fiber to another in the pull cable, or as a result of slight slippage which may occur in the clamps holding the cable. Additionally, if the parallelogram structure of the suspension system moves slightly, due for example to slippage in its attachment points, the clamp at the bottom of the pull cable and the direction of pull may no longer be perpendicular to the lever arm. Although the change in the applied moment may be ever so slight, the amount of error introduced into the weighing process as a result of such a change often is sufficiently great to cause concern, particularly when lightweight objects are being weighed. For example, a change of only 25 mils in a 2.5" moment arm has an effect of 0.1% on the measured weight.

Flexure base scales of the type disclosed in the second embodiment of applicants '416 application employ a symmetrical arrangement of moving beams that will minimize the adverse effect of rotational and horizontal vibrations imparted to the moving elements of said scale. In the specific embodiment disclosed in the '416 application the movable beams also are counterbalanced for the purpose of minimizing the adverse effect of vibrations in the up/down direction. Although the counterbalanced flexure base scale disclosed in the '416 application has not been used, sold or otherwise disclosed in a manner to make it prior art against the invention disclosed and claimed herein, it is discussed herein because it provides a background against which the present invention can be better understood.

Although the flexure base scale disclosed in the '416 application is generally acceptable for its intended purpose, it does have certain deficiencies that make it unsuitable for the high precision measurement of lightweight objects.

First, flexure base scales are large, with the internal moving elements thereof being of a fairly high mass. Regardless of the measures taken in designing such a scale, some movement of these internal elements will occur if the scale is subject to vibrations from the surrounding environment. The fact that these elements are of a high mass construction, exacerbates the problem of achieving accuracy in the weighing operation. In other words, the adverse effects of vibrations on the accuracy of a scale can be reduced by reducing the mass of the elements that are subject to movement under the influence of such vibrations. Unfortunately, flexure base scales are inherently large scales employing high mass moving elements.

Second, electronic position sensing means of flexure base scales generally are mounted on horizontally disposed members, and are required to move vertically to provide a signal indicative of the weight of the material. Even when the counterbalanced arrangement disclosed in applicant's '416 application is employed, the horizontal mounting of the position sensing means generally will cause some undesired vertical excursions of the position sensing means to occur when vibrations are imparted to the scale in the up/down direction, and this introduces undesired errors into the weighing operation.

There also are other types of prior art scales which do not utilize a pivot arm, but which use a spring or other means to bias a platform upwardly against the downward force of a load being weighed, also are subject to weighing inaccuracies attributable to vibrations of the type described above.

OBJECTS OF THE INVENTION

Accordingly, it is a general object of the instant invention to provide an improved and highly sensitive and accurate weighing scale.

It is a further object of the invention to provide a weighing scale, preferably electronic, which minimizes weighing inaccuracies attributable to vibrations transmitted to the scale from its surrounding environment.

It is a further object of this invention to provide a weighing scale, preferably electronic, which minimizes weighing inaccuracies attributable to rotational vibrations imparted to said scale.

It is still a further object of this invention to provide a weighing scale, preferably electronic, which minimizes weighing inaccuracies attributible to either linear or rotational vibrations imparted to said scale.

It is still a further object of this invention to provide a weighing scale, preferably electronic, which minimizes weighing inaccuracies attributible to slight shifts or variations in the internal location and/or direction at which the applied force acts.

SUMMARY OF THE INVENTION

These and other objects of the instant invention are readily achieved by providing a scale which can be used to weigh and to measure other parameters of a material or object, wherein the scale includes stationary frame means, platform means arranged to move vertically upon receipt of some material thereon, at least one movable beam assembly; each of said movable beam assemblies being movably coupled to said frame means by a force sensing means; each of said force sensing means including force resisting means for resisting downward movement of said platform means; said platform means being coupled to each beam assembly that is movable; each movable beam assembly having a section for supporting displacement sensing means thereon, said displacement sensing means detecting movement of the movable beam assemblies by moving generally transverse to the vertical direction of movement of the platform means when said material is received on said platform means and producing a signal indicative of the weight of said material.

In the preferred embodiment of this invention the scale includes opposed movable beam assemblies, each of said beam assemblies being movably coupled to the stationary frame means by a force sensing means, said platform means being coupled to said beam assemblies between the pair of force sensing means, and the displacement detecting means being position sensing means, preferably electronic, coupled to said beam assemblies. The electronic position sensing means being operable to detect relative movement of the beam assemblies transmitted through the platform means when said material is received on said platform means, said position sensing means producing an electrical signal indicative of the weight of said material.

In the most preferred embodiment of this invention each of the beam assemblies is rotatable about it respective force sensing means, and a counterbalance means is employed in connection with each of the beam assemblies for approximately balancing and establishing an equilibrium state for each beam assembly generally along the rotational axis of its respective force sensing means when no material is on the platform.

In the most preferred embodiment of this invention the displacement detecting means is in the form of opposed capacitor plates oriented in a substantially vertical plane, with the confronting planar surfaces of said plates being oriented in this same substantially vertical plane, parallel to the direction of movement of the platform means.

DESCRIPTION OF THE DRAWINGS

Other objects and many of the attendant advantages of this invention will be readily appreciated as the same becomes better understood by reference to the following detailed description when considered in connection with the accompanying drawings, wherein.

DESCRIPTION OF THE PREFERRED EMBODIMENT OF THE INVENTION

Figures 1, 2:
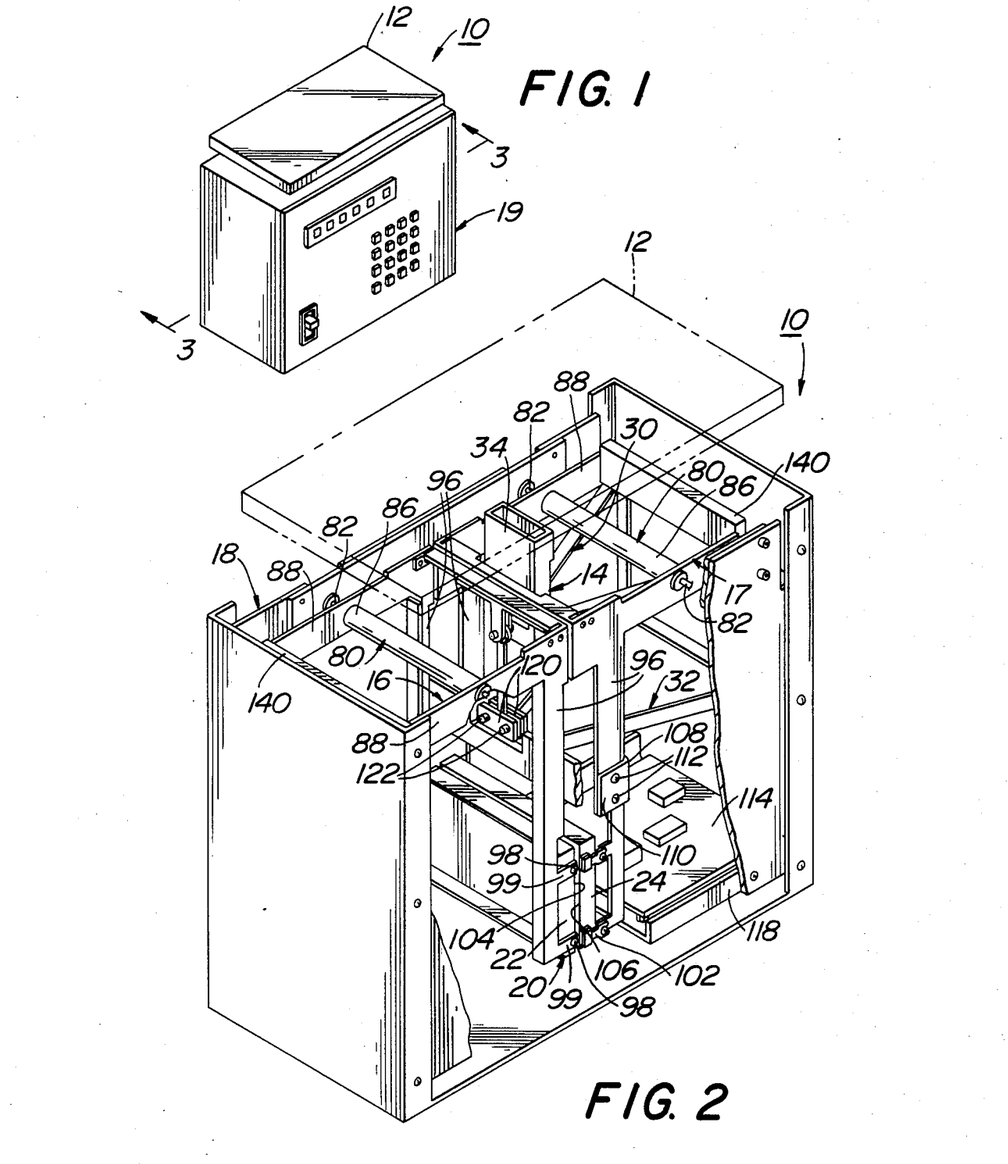
FIG. 1 is an isometric view of an electronic scale constructed in accordance with the instant invention.
FIG. 2 is an isometric view of the electronic scale shown in FIG. 1, with parts removed to show details of construction.

Referring now in greater detail to the various figures of the drawings wherein like reference characters refer to like parts, a scale embodying the present invention is generally shown at 10 in FIGS. 1 and 2. Device 10 basically comprises a weighing platform 12 connected through a suspension system 14 to a pair of beam assemblies 16 and 17 that, in turn, are rotatably mounted to a stationary frame assembly 18 located within an outer casing 19. Electronic position sensing means 20, preferably in the form of opposed generally vertically oriented capacitor plates 22 and 24, are attached to, and are movable with the beam assemblies 16 and 17 for detecting movement of the beam assemblies transmitted through the weighting platform 12 when a material is placed on said platform. The sensing means 20 produces a signal indicative of the weight of the material on the platform.

Although the device 10 is referred to as a "scale" throughout this patent application, the instant invention is not limited to that of a "weighing" device, but can also be used for determining the mass, density, volume and other parameters of a liquid or solid, whenever weight can be used as a factor in making such a determination. Moreover, the instant invention relates to an improved mechanical construction, and not to the scale's electronic circuitry, which is conventional. In addition, certain features of this invention are applicable to mechanical scales as well as electronic scales. However, the invention is most advantageously employed in highly sensitive electronic scales to provide extremely accurate measurements of lightweight objects.

With the foregoing in mind, details of the preferred embodiment of this invention will now be described.

Figure 3:
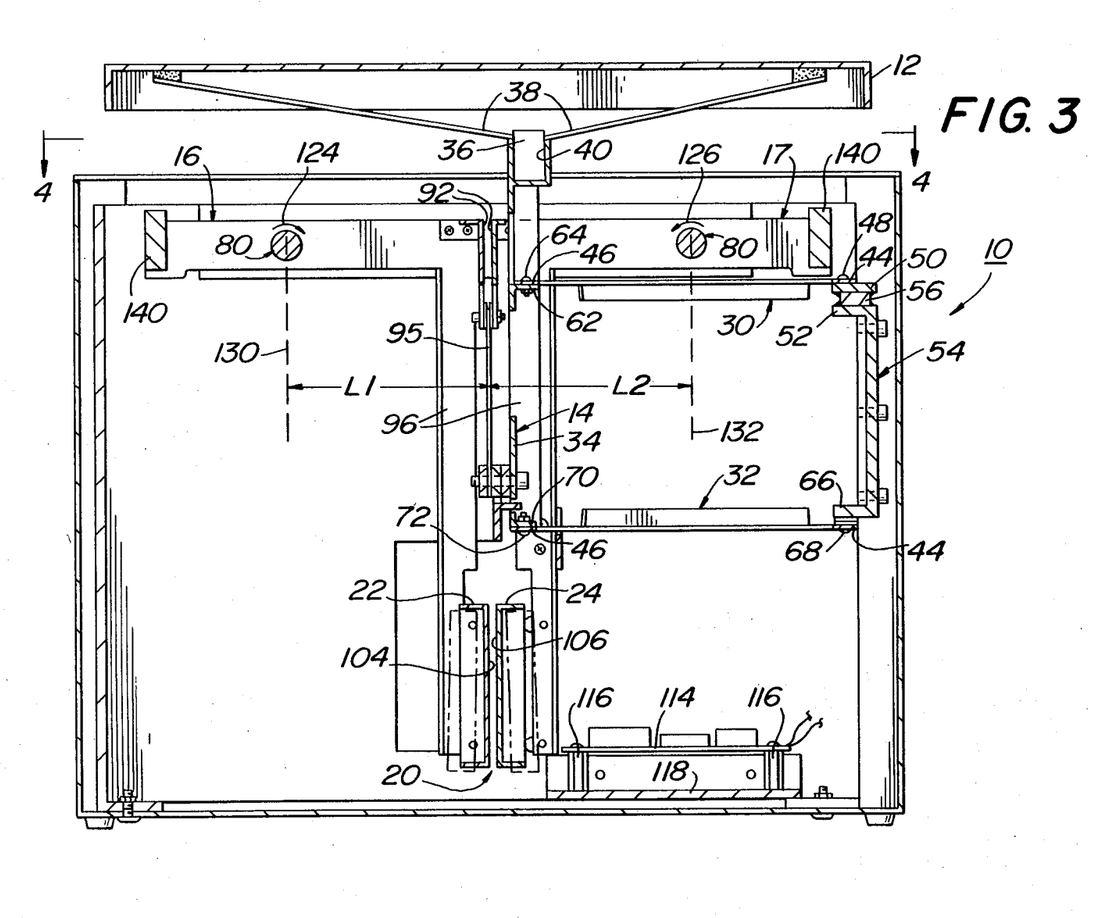
FIG. 3 is a longitudinal sectional view taken along line 3—3 of FIG. 2.
Figure 4:
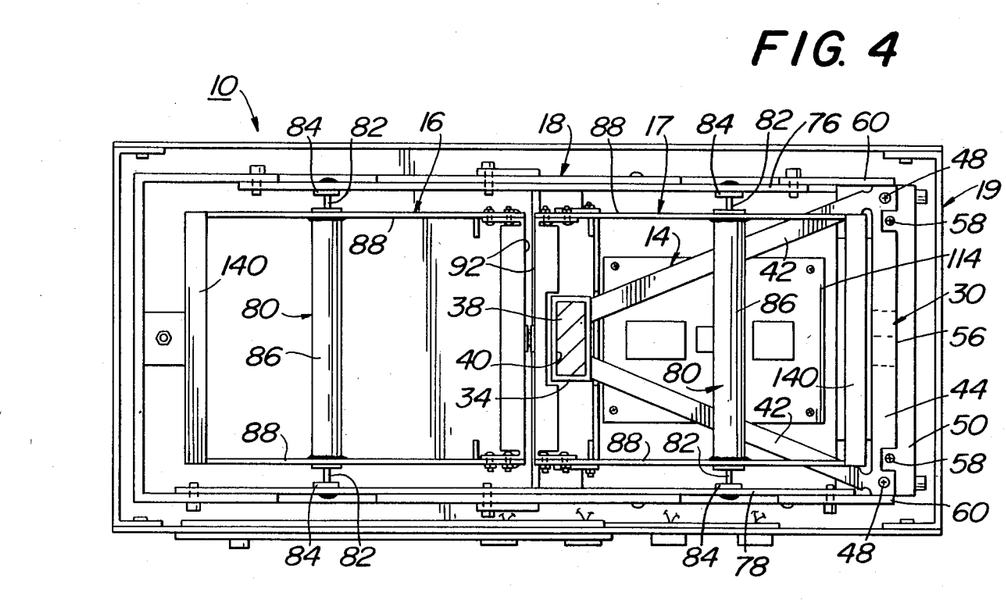
FIG. 4 is a plan view showing the arrangement of elements within the casing of the scale, taken along line 4—4 of FIG. 3.

Referring specifically to FIGS. 2-4, the suspension system 14 is mounted to elements of the stationary frame assembly 18, to be described hereinafter, for supporting the weighing platform 12 and insuring that only the vertical component of the load placed on the platform is transferred to the electronic position sensing means 20.

The suspension system 14 comprises upper and lower parallelogram members 30 and 32, and an interconnecting vertical column 34 on which the weighing platform 12 is mounted. In the illustrated embodiment a generally rectangular member 36, connected to the weighing platform 12 by four interconnecting spiders 38 (only two of which are shown), is received within an upper compartment 40 of the vertical column 34.

The suspension system 14 is of a conventional construction, and is very similar to the suspension systems disclosed in Applicant's U.S. patent application Ser. Nos. 526,178, entitled "Electronic Scale With Non-Parallel Capacitance Means"; 670,659, entitled "Torsion Load Cell" and 584,412, entitled "Electronic Scale With Counterbalance", the subject matter of which is herein incorporated by reference.

The upper and lower parallelogram members 30 and 32 are of an identical construction, and therefore the description of the upper parallelogram member 30 which follows applies equally to the lower parallelogram member 32. As can be seen best in FIGS. 3 and 4, the upper parallelogram member 30 is a metal member, preferably made of aluminum, and includes a pair of elongated legs 42 forming an acute angle with a rear section 44, and an obtuse angle with a shorter, front section 46.

Adjustment of the vertical angle of the legs 42 of the upper parallelogram member 30 is permitted by an arrangement of elements similar to that disclosed in U.S. patent application Ser. No. 584,412, the subject matter of which already has been incorporated herein by reference. Specifically, the rear peripheral edges of the upper parallelogram member are connected by suitable fastening means, such as screws 48, directly to an elongate, flexible adjustment bar 50. This adjustment bar is a generally planar member which is flexible in the up-/down direction, and normally is biased upwardly.

Referring specifically to FIGS. 3 and 4, the flexible adjustment bar 50 is permitted to move in an up/down direction by being spaced from an upper, horizontal flange 52 of a rear frame element 54 by a spacer member 56. The spacer member 56 is welded to the upper surface of the flange 52 and to the lower surface of the flexible adjustment bar 50 at a location intermediate the opposed ends of said adjustment bar (see FIG. 4). In this manner the opposed ends of the adjustment bar are spaced vertically upwardly from the horizontal flange 52 of the rear frame element 54, and are permitted to move in an up/down direction relative to the flange as a result of this spacing.

As mentioned earlier, the flexible adjustment bar 50 is normally biased in an upward direction, i.e., in a direction away from the upper horizontal flange 52. In order to control the up/down movement of the adjustment bar 50 a pair of adjustment screws 58 are provided. These adjustment screws, which are illustrated in FIG. 4, pass through the flexible adjustment bar 50, and are received within threaded openings (not shown) provided in the upper horizontal flange 52 of the frame element 54. In this manner, clockwise rotation of the screws 58, to move them into the threaded openings in the horizontal flange 52, moves the opposed ends of the adjustment bar 50 downwardly, in a direction toward the horizontal flange 52. Movement of the screws 58 in the opposite direction will result in the adjustment bar moving upwardly, in a direction away from the horizontal flange 52, due to the fact that the adjustment bar normally is biased to move in this latter direction.

It should be noted that the rear frame element 54 constitutes part of the stationary frame assembly 18, and is mounted against movement by being attached to stationary side frame members 60 of said frame assembly by any suitable means, such as by welding. The specific manner in which the rear frame element 54 is attached to the side frame members 60 is a matter of design choice, and does not constitute a feature of the present invention. The important feature is that the rear frame element 54 be formed as part of a stationary frame assembly for purpose of mounting the suspension system 14 thereto.

As can be seen best in FIG. 3, the front section 46 of the upper parallelogram member 30 is secured to an inwardly directed, horizontal flange 62 of the vertical column 34 by suitable fastening means, such as a pair of screws 64 (only one being shown) located at the junction of each of the elongated legs 42 with the front section 46.

Still referring to FIG. 3, the lower parallelogram member 32 is connected to a lower horizontal flange 66 of the rear frame element 54 by suitable fastening means, such as a pair of screws 68 (only one being shown) that are located in vertical alignment with the screws 48 employed to fasten the upper parallelogram member 30 to the upper horizontal flange 52.

The opposed, front section 46 of the lower parallelogram member 32 is secured to a lower horizontal flange 70 of the vertical column 34 by suitable fastening means, such as a pair of screws 72 (only one being shown in FIG. 3) located at the junction of the elongated legs and said front section 46 of the lower parallelogram member. The screws 72 are in vertical alignment with the screws 64 employed to connect the front section 46 of the upper parallelogram member 30 to the inwardly directed horizontal flange 62.

As stated earlier, the use of parallelogram members in a scale suspension system is a conventional technique to insure that only the vertical component of a load positioned on the weighing platform of the scale is transferred to the displacement detecting system. In the case of this invention the upper and lower parallelogram members 30 and 32 perform this function. Therefore, only the vertical component of the load on the weighing platform 12 is transmitted to the electronic sensing means 20 by the suspension system 14. Moreover, the suspension system counteracts all side loads and twisting moments, which might be applied through the weighing platform 12, and rigidly resists all motions of the vertical column 34, except for up/down movement of said column.

Referring to FIGS. 2–4, a unique feature of this invention resides in the provision of opposed, generally similar beam assemblies 16 and 17, each of which is rotatably mounted to laterally spaced-apart side stationary frame members 76, 78 of the stationary frame assembly 18 through spring means 80. As shown, the spring means preferably are elongate cylindrical members in the form of torsion bars.

As can be seen best in FIGS. 2 and 4, each torsion bar 80 is formed of a strong, yet resilient material, (e.g., aluminum) and includes a pair of reduced diameter neck sections 82, each of which is adjacent a respective end 84 of the bar. Each end 84 of the bar is fixedly secured, such as by welding, to a respective side frame member 76, 78 of the frame assembly 18. The reduced diameter neck portions 82 of each bar are of substantially smaller cross-section than the remainder of the bar, and serve as the actual spring means of the device by constituting the twist situs when a torque is applied to intermediate portion 86 of said bar relative to the end portions 84 thereof. In this regard the intermediate portion 86 of each of the torsion bars 80 is of a greater diameter, or width, than the reduced diameter neck portions 82, and extends through openings in opposed upper side walls 88 of each of the beam assemblies 16 and 17. The intermediate portion 85 of each of the torsion bars 80 is firmly secured to the opposed upper side walls 88 by weldments, or other suitable fastening means.

It should be noted that each of the reduced diameter neck portions 82 of the torsion bars 80 is of relatively short length to minimize any bending which might occur along these portions. In other words, it is important to the accurate operation of the scale that movement of the opposed beam assemblies 16 and 17 take place by substantially only rotational movement resulting solely from twisting of the torsion bars 80 at their reduced diameter neck sections 82.

In the most preferred embodiment of this invention each neck portion 82 is approximately 2½ times its diameter, and the shortness of each neck portion is limited by the fact that the shorter the length, the greater is the twist per unit of length and stress. In an exemplary embodiment of this invention each torsion bar 80 has an overall length of approximately 4.25 inches with the intermediate portion 86 being approximately 3.125 inches long, the reduced diameter neck sections each being approximately 0.125 inches long, and the respective end portions each being approximately 0.438 inches long. Other details relating to the advantages achieved by the use of the preferred torsion bars 80 in accordance with this invention are set forth in copending application Ser. No. 690,659, entitled "Torsion Load Cell", and already incorporated herein by reference.

Referring specifically to FIGS. 3 and 4, the beam assemblies 16 and 17 include opposed, closely adjacent inner walls 92 that are interconnected with a suitable connecting means, such as a screw and nut system 94. This screw and nut system 94 also positively attaches a thin flexible metal strap 95 to the opposed beam assemblies for use in interconnecting the beam assemblies to the weighing platform 12, as will be described in detail hereinafter. In a preferred arrangement of this invention the strap 95 is a metal member, such as stainless steel, and has a thickness of approximately 3–4 mils.

A highly desirable feature of this invention is that the electronic sensing means 20 is mounted on downwardly extending, substantially vertically oriented arms 96 of the beam assembly 16 and 17, at a location vertically below the torsion bars 80, and movement of the sensing means 20 in a generally horizontal direction is relied upon to provide a signal indicative of the weight of a material on the vertically movable weighing platform 12. In other words, in applicant's preferred construction the weighing platform 12 moves in a vertically downward direction when a material to be weighed is placed thereon, but the motion of the position sensing means relied upon to provide an electrical signal indicative of the weight of the material is in a generally horizontal direction, substantially perpendicular to the direction of movement of said weighing platform.

In the most preferred embodiment of this invention the electronic sensing means 20 is in the form of opposed, generally vertically oriented capacitor plates 22 and 24 mounted to the lower end of laterally spaced apart, downwardly extending arms 96 of the beam assembly 16 and 17. It should be noted that although the capacitor plates 22 and 24 technically move in an arcuate path resulting from the twisting movement of the torsion bars 80, the fact that these plates are mounted at the lower end of the vertically extending arms 96 results in the arc of movement of the capacitor plates being essentially horizontal.

As a result of the above arrangement, wherein the capacitor plates 22 and 24 are oriented substantially vertically in the direction of movement of the weighing platform, errors introduced into the weighing operation by vibrations in the up/down direction are greatly minimized, as compared to an arrangement wherein relatively movable capacitor plates are oriented in a generally horizontal direction, with relative movement in the up/down direction being relied upon to provide an electrical signal indicative of a weight of a material being measured. In these latter scales vibrations imparted in the up/down direction can cause a similar up/down movement of the horizontally disposed movable capacitor plate. This, in turn, results in an uncontrolled change in the gap between opposed capacitor plates to thereby introduce error in the signal generated in response to the change of capacitance between said plates.

In applicant's construction up/down vibrations imparted to the scale, even if imposed upon the vertically oriented capacitor plates, will not impart substantial movement to the capacitor plates in a direction which substantially changes the capacitance between them. Stating this another way, vibrations imparted to applicant's scale in the up/down direction are generally parallel to the vertical orientation of the downwardly extending arms 96 of the beam assemblies 16 and 17, and to the generally vertical orientation of the capacitor plates 22 and 24. As a result of this arrangement the up/down vibrations do not impart significant capacitance-changing movement to the capacitor plates in a direction substantially perpendicular to the up/down direction of the vibration. Although lateral vibrations imposed upon the scale could be in a direction in which the capacitor plates 22 and 24 are intended to move to provide a signal representative of the weight of a material being measured, the symmetrical arrangement of elements in applicant's scale 10 counteracts the effects of such lateral vibrations, thereby greatly minimizing lateral movement of the capacitor plates 22 and 24 in a manner which would introduce undesired errors into the weighing operation.

As can be seen best in FIGS. 2 and 3, the capacitor plate 22 is connected in electrically conductive, grounded communication with the laterally spaced-apart, downwardly extending arms 96 of the beam assembly 16 through the use of fastening means, such as screws 98, extending into side walls of the capacitor plate 22 through laterally projecting ears 99 of the arms 96. The opposed capacitor plate 24 is connected to the laterally spaced-apart downwardly extending arms 96 of the beam assembly 17 through strap members 102 that are insulated from the capacitor 24 by a plastic insulating member 103 or other suitable insulating material.

In the most preferred embodiment of this invention the capacitor plates 22 and 24 are adjusted so that when they are in a null or neutral position (e.g., when no load is resting on the weighing platform 12), confronting planar surfaces 104 and 106 of the respective plates are not parallel with respect to each other. Although not clearly shown in the various figures of the drawing, the gap between the confronting planar surfaces 104 and 106 is widest adjacent the lower most edges of the respective plates 22 and 24, and narrowest adjacent their uppermost edges, when the scale 10 is in a neutral or null position. In the preferred embodiment of this invention the confronting surfaces 104 and 106 are situated along respective planes which intersect at a line located within the horizontal plane including the horizontal axes of the torsion bars 80.

Further details relating to the preferred manner of orienting the capacitor plates 22 and 24 at an angular position relative to each other when the scale is in a neutral or null position can be found in copending application Ser. No. 526,178, entitled "Electronic Scale With Non-Parallel Capacitance Mean", and already incorporated herein by reference. Although the capacitor plates employed in the device disclosed in the '178 application are disposed in a generally horizontal plane, the general principles discussed in that application relating to the desired angular orientation of the plates relative to each other are applicable to this invention.

As can be seen best in FIGS. 2 and 3, a laterally extending, metal reinforcing strip 108 extends between the laterally spaced apart arms 96 of the beam assembly 17, and includes flange sections 110 at its opposed ends (only one being shown in FIG. 2) for attachment to the opposed outer surfaces of the arms 96 by suitable fastening means, such as screw and nut systems 112. This strip 108 serves to preclude movement of the arms 96 that are connected to the capacitor plate 24 through the flexible strap members 102, to thereby maintain the desired position of said arms relative to each other. A similar reinforcing strip is not used in the beam assembly 16 because the capacitor plate 22, which is directly connected to the spaced-apart arms 96 of said beam assembly, also serves to stabilize the location of those arms.

Referring specifically to FIGS. 2 and 3, the weighing platform 12 is coupled to the opposed beam assemblies 16 and 17 by connecting the metal strap 95 to the vertical column 34 of the suspension system 14, which column is connected to the weighing platform 12. This connection is accomplished by positioning the lower end of the strap, with the strap in a taut condition, between clamping members 120, and firmly clamping the strap between said members by actuation of a pair of screws 122. In this regard the outermost clamping member 120 is provided with threaded openings to permit it to be forced into clamping engagement with the adjacent clamping member 120 and the strap 95 between them.

As a result of the above-described connection, the placing of a weight on the weighing platform 12 results in the downward vertical movement of the vertical column 34, which is attached to the platform 12 and constitutes part of the suspension system 14. Downward movement of the vertical column 34 is transmitted to the metal strap 95, as a result of the connection of the vertical column 34 to the strap by the clamping members 120 and actuating screws 122. Downward movement of the strap 95 pulls the inner walls 92 of the opposed beam assemblies 16 and 17 in a downward direction, thereby causing clockwise rotation of the beam assembly 16 about its connecting torsion bar 80, and counterclockwise rotation of the beam assembly 17 about its connecting torsion bar 80, as is illustrated by arrows 124 and 126, respectively, in FIG. 3. Rotational movement of the beam assemblies 16 and 17 when a load is placed on the platform 12 causes the gap between the adjacent planar surfaces 104 and 106 of the capacitor plates 22 and 24 to widen; resulting in a change in capacitance that is directly related to the amount of vertical displacement of weighing platform 12. Since the amount of vertical displacement of the weighing platform 12 is directly related to the weight of the material on said platform, the change in capacitance is directly related to the weight of the material.

The plates 22 and 24 of the electronic sensing means 20 are connected by electrical conductors (not shown) to the input of a variable frequency oscillator. The oscillator produces an electrical signal whose output frequency is a function of the capacitance of the electronic sensing means 20, and hence, a function of the vertical displacement of the weighing platform 12. The electrical signal from the variable frequency oscillator is acted upon by the electronic circuitry of the device 10 to produce a reading of weight, volume, or density of the material placed on the platform. In this regard, the electrical circuitry of the apparatus is a conventional oscillator circuit not forming a part of the present invention, and therefore is not shown or described in this application.

Suffice it to state herein, the electrical components of the oscillator are located on a circuit board 114 which is mounted by standoffs 116 on base frame member 118 of the frame assembly 18. The electrical component shown on the circuit board 114 are merely exemplary of the actual components used.

It should be noted that the metal strap 95, through which the weight of the material being weighed is transmitted to the beam assemblies 16 and 17, is located approximately midway between imaginary lines substantially parallel to the strap, and passing through the axes of rotation of the spaced-apart torsion bars 80. These imaginary lines are identified in FIG. 3 by the numerals 130 and 132, respectively, and the distances L1 and L2 between these lines and the strap 95 constitute moment or lever arms through which the weight, or applied force imparted to the strap acts. Thus, as can be seen in FIG. 3, the moment arm L1, which constitutes the moment arm for the beam assembly 16, is substantially equal to the moment arm L2 for the beam assembly 17 when an applied downward force is imparted to the strap 95 by a load placed on the weighing platform 12.

A significant feature of this invention resides in the fact that a load placed on the platform 12 creates opposed torques on the beam assemblies 16 and 17 about their respective torsion bars 80. That is, as viewed in FIG. 3, the torque imparted to the beam assembly 16 is in a clockwise direction, whereas the torque imparted to the beam assembly 17 is in a counterclockwise direction. This results from the fact that the moment arms for each of the beam assemblies is on opposite sides of the strap 95, through which the weight of the load is transmitted to said beam assemblies.

An important advantage of locating the moment arms for the beam assemblies 16 and 17 on opposite sides of the strap 95 is that any change in the applied moment imparted to one of the beam assemblies, through the pull strap 95, will be offset by a corresponding, but opposite change in the applied moment to the other beam assembly. Although in an ideal system the pull strap 95 would always remain perpendicular to the lever arm, and the center of action of the applied force on the beam assemblies would be along the center line of the pull strap, such an ideal system does not exist.

In practice, the center of action of the pull force may move from the center line of the pull strap in an essentially unpredictable manner with time and usage of the scale. This will result in corresponding changes in the length of the lever arms through which the applied force acts. Additionally, if the parellelogram structure of the suspension system 14 moves slightly due to, for example, slippage in its attachment points, the pull strap may be moved into an orientation which is not perpendicular to the lever arm, and the direction of pull (i.e., the direction of the applied force) may no longer be perpendicular to said lever arm. However, as stated above, any change in the applied moment on one of the beam assemblies 16 or 17 is counteracted by a corresponding but opposite change in the applied moment to the other beam assembly. This results from the fact that the change in applied moments results from a change in the effective length of the lever arms L1 and L2 of the beam assemblies 16 and 17, and, due to the symmetrical arrangement of these beam assemblies, any change in the length of one of the lever arms results in a corresponding, but opposite change in length in the other lever arm. In other words, if the lever arm L1 is shortened due to a lateral shifting of the applied force to the left, as viewed in FIG. 3, then the lever arm L2 will be lengthened, by the exact amount that L1 is shortened. Thus, any deviation in the length of one of the moment arms is offset by a corresponding, but opposite change in the other moment arm to thereby substantially offset any adverse effect that otherwise might occur in a weighing operation.

In the devices disclosed in my U.S. patent application Ser. Nos. 526,178; 670,659 and 584,412, which applications already have been incorporated by reference herein, a change in the length of the moment arm through which the weight of the load acts causes a change in the perceived weight of the material located on the weighing platform. For example, with a 2.5 inch moment arm, a change of only 0.0025 inches will have the effect of changing the perceived weight by 0.1%.

A further advantage of the scale 10 of this invention is that rotational acceleration imparted to the scale through vibration from the surrounding environment has virtually no adverse effect on the accuracy of the weighing operation. This occurs because rotational acceleration of the beam assemblies in a given direction of rotation acts through the beam assemblies 16 and 17 to substantially cancel each other.

To further explain how vibrations imparting a rotational acceleration to the beam assemblies 16 and 17 have virtually no adverse effect on the accuracy of the scale 10, assume that vibrational forces are imposed upon the scale 10 to impart clockwise rotational acceleration forces on the opposed beam assemblies 16 and 17 about their respective torsion bars 80, as viewed in FIG. 3. Note that clockwise rotational acceleration of the beam assembly 16 would cause its respective inner wall 92 to move in a downward direction, whereas, this same clockwise rotational acceleration of the beam assembly 17 would cause its respective inner wall 92 to move in an upward direction. Since the two inner walls are interconnected to each other through the screw and nut system 94, the tendency for the inner wall of the beam assembly 16 to move in a downward direction is cancelled by the opposing tendency of the inner wall of the beam assembly 17 to move in an upward direction. Thus, vibrations importing rotational acceleration forces to the scale 10 have substantially no adverse effect on the operation of said scale.

Referring to FIG. 3, in the most preferred embodiment of the scale 10, counterbalancing means 140 are provided on each of the beam assemblies 16 and 17 to counteract, or offset inaccuracies in the weighing process attributable to vertical acceleration of the moving components of the scale caused by vibration transmitted to the scale from external sources, e.g., vibration transmitted to the scale from the supporting surface upon which the scale is resting. It should be understood that such counterbalancing means may not be required in all embodiments of the invention, since in some environments the moving components of the scale may not be subject to vertical acceleration caused by vibration transmitted from external sources. However, in the preferred embodiment of this invention counterbalancing means 140 are provided in a manner which will now be described.

As can be seen best in FIGS. 3 and 4, the counterbalance means 140 are in the form of elongated bars interconnected to the opposed upper side walls 88 of each of the beam assemblies 16 and 17 on the side of the torsion bar 80 opposite from the strap 95, along which the weight of a load placed on the weighing platform 12 is transmitted to said beam assemblies. In the most preferred embodiment of this invention the weight of each of the bars 140 is chosen such that the center of gravity of each beam assembly, including the capacitor plate and counterweight 140 thereon, is disposed approximately along the axis of rotation of the corresponding torsion bar 80, when there is no material or load on the weighing platform 12. This balanced state insures that vertical movement or vibration of the stationary frame assembly 18 does not readily result in vertical motion or acceleration of the beam assemblies 16 and 17. Therefore, weighing inaccuracies attributable to such vertical vibrations are substantially, if not entirely, eliminated.

Again, it should be emphasized that even if some vertical vibration is imparted to the movable elements of the scale 10, the vertical orientation of the capacitor plates 22 and 24 will minimize the adverse effect of such vibrations on the weighing operation. Stating this another way, due to the vertical orientation of the capacitor plates 22 and 24 tranverse, or horizontal movement between them is relied upon to produce a signal indicative of the weight of material on the weighing platform 12. Vertical vibrations imparted to these capacitor plates do not tend to impart such a transverse or horizontal motion to the capacitor plates.

In summary, undesired acceleration of the movable components of the scale 10 of this invention resulting from vibrational forces imparted to the scale from external sources is virtually eliminated, thereby eliminating or substantially reducing weighing errors that would otherwise result from such vibrations.

Without further elaboration the foregoing will so fully illustrate my invention that others may, by applying current or future knowledge, adopt the same for use under various conditions of service.

I claim:

1. A scale comprising stationary frame means, platform means arranged to move upon receipt of some material thereon, opposed beam assemblies coupled to said platform means, each of said beam assemblies being rotatably coupled to said frame means by a force sensing means; each of said force sensing means including force resisting means for resisting downward movement of said platform means; said platform means being coupled to said beam assemblies between the pair of force sensing means; said beam assemblies having closely adjacent, confronting sections; a non-sliding connection securing together said closely adjacent sections of said beam assemblies for preventing relative rotational movement between said beam assemblies; displacement sensing means; each beam assembly having a section for supporting said displacement sensing means thereon in a position vertically spaced from the rotatable couplings; counterbalancing means on each beam assembly on the side of the force sensing means opposite the platform means for locating the center of gravity of each beam assembly, including the displacement sensing means and counterbalancing means thereon, approximately along the rotatable coupling of said each beam assembly; said displacement sensing means detecting rotatable movement of the beam assemblies transmitted through the platform means when said material is placed on said platform means by moving generally transverse to the direction of movement of the platform means when said material is received on said platform means and producing a signal indicative of the weight of said material.

2. The scale of claim 1 wherein said displacement sensing means are electronic sensing means.

3. The scale of claim 2 wherein the position sensing means is electronic position sensing means.

4. The electronic scale of claim 3 wherein said electronic position sensing means includes a pair of parallel capacitor plates having adjacent surfaces each lying in a plane generally aligned with the vertical direction in which the platform means is moved and being movable relative to each other in a direction generally transverse to said vertical direction.

5. The scale of claim 4 where each beam assembly includes arm means oriented in a generally vertical direction, each of said arm means supporting a respective capacitor plate at a location spaced vertically from the force sensing means coupling said respective beam assembly to the frame means, said adjacent surfaces of the capacitors lying in a generally vertical plane.

6. The scale of claim 5 wherein each force sensing means is an elongate torsion member.

7. The scale of claim 1 characterized in that each force sensing means is an elongate torsion member.

8. The scale of claim 7 wherein the coupling of the platform means to the opposed beam assemblies is substantially midway between said elongate torsion members.

9. The scale of claim 8 wherein each of the elongate torsion members is attached to spaced side walls of a respective beam assembly and to closely adjacent members of said stationary frame assembly, each of said elongate torsion members including a pair of reduced thickness sections, each of said reduced thickness sections being located between a respective side wall of the beam assembly and the member of the frame assembly to which said side wall is closely adjacent, whereby rotational movement of each beam assembly upon movement of the platform means takes place by twisting of the reduced thickness sections of said torsion members.

10. The scale of claim 9 wherein said displacement sensing means includes a capacitor plate attached to each of said beam assemblies.

11. The scale of claim 10 wherein each beam assembly includes vertically extending arm means, each of said arm means supporting a respective capacitor plate of the position sensing means at a location spaced vertically from the pair of elongate torsion members.

12. The scale of claim 11 wherein each capacitor plate is generally vertically oriented, said plates including adjacent surfaces movable in a generally horizontal direction for producing the signal indicative of the weight of the material.

13. A highly sensitive and accurate electronic scale which minimizes weighing inaccuracies attributable to the imposition of linear and rotational vibrational forces imparted to said scale, said scale comprising stationary frame means, platform means arranged to move upon receipt of some material thereon, opposed beam assemblies coupled to said platform means, each of said beam assemblies being rotatably coupled to said frame means through nonsliding, rotatable connections; said platform means being coupled to said beam assemblies between the rotatable couplings of the beam assemblies to the stationary frame means; said beam assemblies having closely adjacent, confronting sections; a non-sliding connection securing together said closely adjacent, confronting sections of said beam assemblies for preventing relative rotational movement between said beam assemblies; electronic displacement sensing means; each beam assembly having a section for supporting said displacement sensing means thereon in a position vertically spaced from the rotatable couplings of said beam assemblies to said stationary frame means; counterbalancing means on each beam assembly on the side of the force sensing means opposite the platform means for locating the center of gravity of each beam assembly, including the displacement sensing means and counterbalancing means thereon, approximately along the rotatable coupling of said beam assembly; said displacement sensing means detecting rotatable movement of the beam assemblies transmitted through the platform means when said material is placed on said platform means by moving generally transverse to the direction of movement of the platform means and producing an electrical signal indicative of the weight of said material.

14. The scale of claim 13 wherein said electronic displacement sensing means includes a pair of parallel capacitor plates having adjacent surfaces adapted to move relative to each other upon movement of the platform means, said adjacent surface each lying in a plane generally aligned with the direction in which the platform means moves.

15. The scale of claim 14 including a thin strap for interconnecting the opposed beam assemblies to said platform means for transmitting movement of the platform means to said beam assemblies, said thin strap being located approximately midway between imaginary lines substantially parallel to the strap and passing through the axes of rotation of the beam assemblies relative to the stationary frame means.

* * * * *